US010713601B2

(12) United States Patent
Vangala et al.

(10) Patent No.: US 10,713,601 B2
(45) Date of Patent: Jul. 14, 2020

(54) PERSONALIZED CONTEXTUAL SUGGESTION ENGINE

(71) Applicant: MICROSOFT TECHNOLOGY LICENSING, LLC, Redmond, WA (US)

(72) Inventors: Vipindeep Vangala, Hyderabad (IN); Ravikiran Arun Aranke, Hyderabad (IN); Nirav Ashwin Kamdar, Hyderabad (IN); Kurumaddali Venkata Madhu Sravanth, Hyderabad (IN)

( * ) Notice: Subject to any disclaimer, the term of this patent is extended or adjusted under 35 U.S.C. 154(b) by 1102 days.

(21) Appl. No.: 15/005,645

(22) Filed: Jan. 25, 2016

(65) Prior Publication Data

US 2016/0321573 A1 Nov. 3, 2016

(30) Foreign Application Priority Data

Apr. 29, 2015 (IN) .......................... 2195/CHE/2015

(51) Int. Cl.
| | |
|---|---|
| G06Q 10/00 | (2012.01) |
| G06Q 10/06 | (2012.01) |
| G06N 20/00 | (2019.01) |
| G06F 16/635 | (2019.01) |
| G06N 5/02 | (2006.01) |
| G06F 16/9537 | (2019.01) |
| G06F 16/9535 | (2019.01) |

(52) U.S. Cl.
CPC .......... *G06Q 10/06* (2013.01); *G06F 16/635* (2019.01); *G06F 16/9535* (2019.01); *G06F 16/9537* (2019.01); *G06N 5/025* (2013.01); *G06N 20/00* (2019.01)

(58) Field of Classification Search
None
See application file for complete search history.

(56) References Cited

U.S. PATENT DOCUMENTS

| 7,546,602 B2 * | 6/2009 | Hejlsberg | .................. | G06F 9/54 |
| | | | | 717/114 |
| 7,716,077 B1 * | 5/2010 | Mikurak | ................ | G06Q 10/06 |
| | | | | 705/7.12 |

(Continued)

FOREIGN PATENT DOCUMENTS

| CN | 102693261 A | 9/2012 |
| CN | 103870550 A | 6/2014 |

OTHER PUBLICATIONS

"International Preliminary Report on Patentability Issued in PCT Application No. PCT/US2016/029641", dated Jul. 17, 2017, 9 Pages.

(Continued)

*Primary Examiner* — Gurkanwaljit Singh
(74) *Attorney, Agent, or Firm* — Shook, Hardy & Bacon, LLP

(57) ABSTRACT

Aspects of the technology described herein provide a more efficient user interface by providing suggestions that are tailored to a specific user's interests. The suggestions may be provided by a personal assistant or some other application running on a user's computing device. A goal of the technology described herein is to provide relevant suggestions when the user can and actually wants to use them. The suggestions are designed to provide information or services the user wants to use.

21 Claims, 5 Drawing Sheets

(56) References Cited

U.S. PATENT DOCUMENTS

| | | | |
|---|---|---|---|
| 7,738,900 B1* | 6/2010 | Manroa | H04L 12/1859 |
| | | | 455/3.01 |
| 7,984,006 B2 | 7/2011 | Price | |
| 8,219,071 B2 | 7/2012 | Kokubo et al. | |
| 8,341,196 B2 | 12/2012 | Immonen et al. | |
| 8,521,750 B2 | 8/2013 | Song et al. | |
| 8,642,872 B2 | 2/2014 | Lu et al. | |
| 8,892,461 B2 | 11/2014 | Lau et al. | |
| 8,924,264 B2 | 12/2014 | Tuzhilin et al. | |
| RE46,310 E * | 2/2017 | Hoffberg | G06F 3/0482 |
| 9,692,765 B2* | 6/2017 | Choi | H04L 63/102 |
| 2002/0138582 A1* | 9/2002 | Chandra | G06Q 10/10 |
| | | | 709/206 |
| 2004/0002958 A1* | 1/2004 | Seshadri | H04L 12/1859 |
| 2004/0002972 A1* | 1/2004 | Pather | G06F 9/542 |
| 2004/0002988 A1* | 1/2004 | Seshadri | G06Q 10/06 |
| 2010/0205541 A1* | 8/2010 | Rapaport | G06Q 10/10 |
| | | | 715/753 |
| 2010/0223576 A1* | 9/2010 | Serra | G06F 21/604 |
| | | | 715/781 |
| 2012/0084248 A1 | 4/2012 | Gavrilescu | |
| 2013/0006904 A1 | 1/2013 | Horvitz et al. | |
| 2014/0052680 A1 | 2/2014 | Nitz et al. | |
| 2015/0019342 A1 | 1/2015 | Gupta | |

OTHER PUBLICATIONS

Abbar, et al., "Context-Aware Recommender Systems: A Service-Oriented Approach", In Proceedings of the 3rd International Workshop on Personalized Access, Profile Management and Context Awareness in Databases, Aug. 28, 2009, 17 Pages.

Baralis, et al., "Context-Aware User and Service Profiling by Means of Generalized Association Rules", In Proceedings of the 13th International Conference on Knowledge-Based and Intelligent Information and Engineering Systems, Sep. 28, 2009, pp. 50-57.

Hong, et al., "Context-Aware System for Proactive Personalized Service Based on Context History", In Expert Systems with Applications, vol. 36, Issue 4, Sep. 18, 2008, pp. 7448-7457.

Oku, et al., "A Recommendation System Considering Users' Past/Current/Future Contexts", In Proceedings of the 2nd Workshop on Context-Aware Recommender Systems, Sep. 10, 2010, 5 Pages.

"International Search Report and Written Opinion Issued in PCT Application No. PCT/US2016/029641", dated Aug. 9, 2016, 12 Pages.

Srinivasan, et al., "MobileMiner: Mining Your Frequent Patterns on Your Phone", In Proceedings of the ACM International Joint Conference on Pervasive and Ubiquitous Computing, Sep. 13, 2014, pp. 389-400.

Zhu, et al., "Mining Personal Context-Aware Preferences for Mobile Users", In Proceedings of the 12th IEEE International Conference on Data Mining, Dec. 10, 2012, pp. 1212-1217.

Ho, Shen-Shyang, "Mining Multivariate Spatiotemporal Patterns from Heterogeneous Mobility Data", In Proceedings of the 20th International Conference on Advances in Geographic Information Systems, Nov. 6, 2012, 10 pages.

Rahman, Mohammed Mahmudur, "Contextual Recommender Systems Using a Multidimensional Approach", In International Journal of Emerging Technology and Advanced Engineering, vol. 3, Issue 8, Aug. 2013, pp. 24-32.

Godoy, et al., "Learning Browsing Patterns for Context-Aware Recommendation", In Proceedings 19th World Computer Congress in Artificial Intelligence in Theory and Practice, vol. 217, Aug. 21, 2006, 10 pages.

Lee, et al., "Context Awareness by Case-Based Reasoning in a Music Recommendation System", In Proceedings of the 4th international conference on Ubiquitous computing systems, Nov. 25, 2007, 6 pages.

"Office Action Issued in European Patent Application No. 16722749.5", dated May 31, 2019, 9 Pages.

Oku, et al., "A Recommendation System Considering Users' Past / Current / Future Contexts", In Proceedings of the 2nd Workshop on Context-Aware Recommender Systems, Sep. 10, 2010, 5 Pages.

"Second Written Opinion Issued in PCT Application No. PCT/US2016/029641", dated Apr. 3, 2017, 8 Pages.

"First Office Action and Search Report Issued in Chinese Patent Application No. 201680025042.8", dated Jan. 17, 2020, 16 Pages.

* cited by examiner

PERSONALIZED CONTEXTUAL SUGGESTION ENGINE

CROSS REFERENCE TO RELATED APPLICATIONS

This application claims priority to Indian Patent Application having Application No. 2195/CHE/2015. filed in India on Apr. 29, 2015, entitled "PERSONALIZED CONTEXTUAL SUGGESTION ENGINE," the entirety of which is hereby incorporated by reference.

BACKGROUND

A personal assistant program provides services traditionally provided by a human assistant. For example, a personal assistant can update a calendar, provide reminders, track activities, and perform other functions. Some personal assistant programs can respond to voice commands and audibly communicate with users. Personal assistants can suggest restaurants, music, tasks, movies, and other items to a user when the user might have an interest in one of these items.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein provide a more efficient user interface by providing suggestions that are tailored to a specific user's interests. The suggestions may be provided by a personal assistant or some other application running on a user's computing device. A goal of the technology described herein is to provide relevant suggestions when the user can and actually wants to use them. The suggestions are designed to provide information or services the user wants to use.

Relevant suggestions and the appropriate time to present the suggestion can be determined by association rules. The association rules are generated by analyzing a user's past actions to determine a probability the user is interested in a suggestion in a given context. The technology described herein can analyze signals describing user actions to build data vectors associated with different types of events. For example, different types of data vectors may describe a movie event, a music event, a travel event, a dinning event, a shopping event, etc. The data vectors are then used as input to a machine learning algorithm to generate association rules.

Once generated, the current context of a user can be monitored to trigger a suggestion associated with the association rule when the context part of the association rule matches the current context.

BRIEF DESCRIPTION OF THE DRAWINGS

Aspects of the technology described in the present application are described in detail below with reference to the attached drawing figures, wherein.

DETAILED DESCRIPTION

Figure 1:
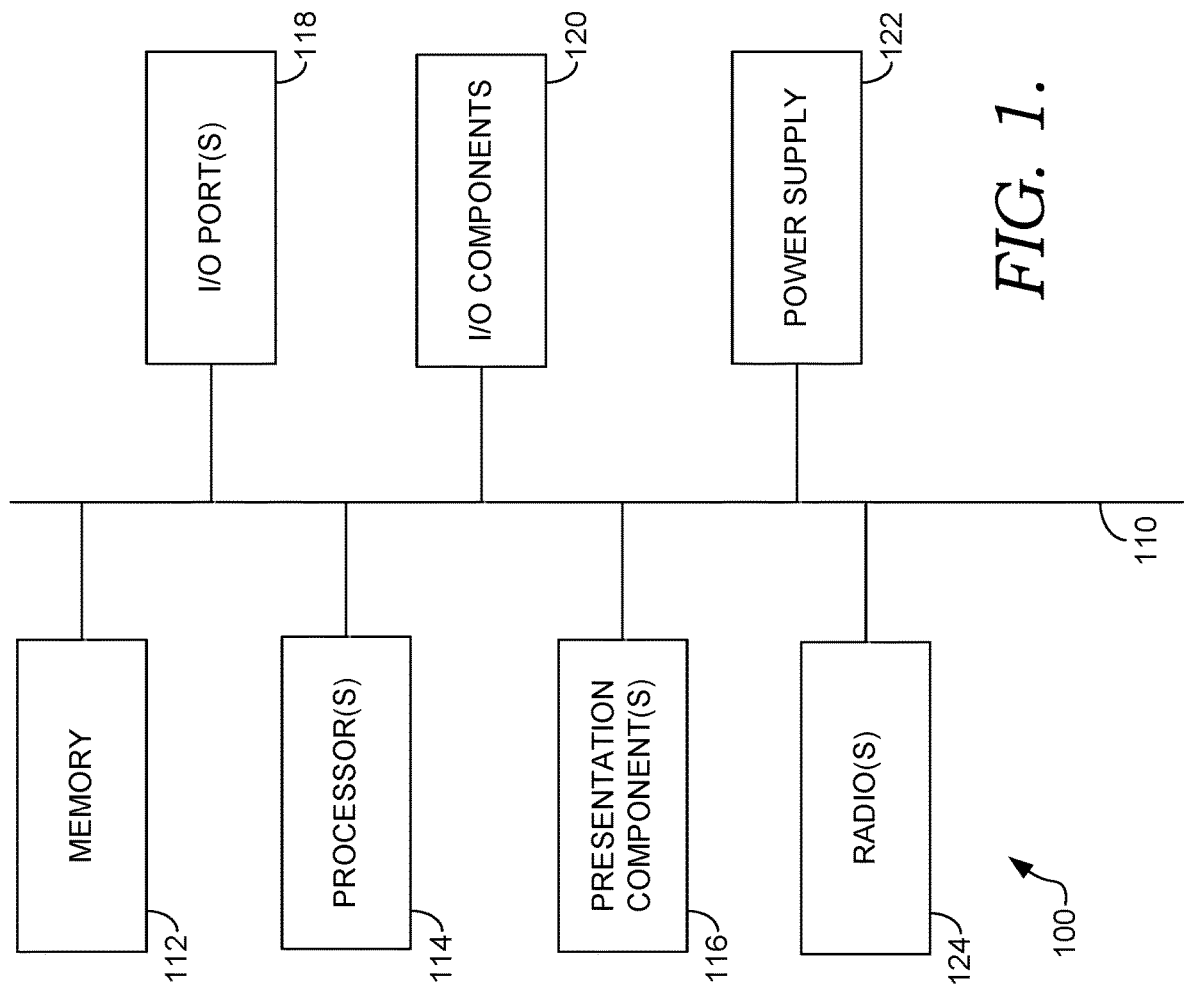
FIG. 1 is a block diagram of an exemplary computing environment suitable for implementing aspects of the technology described herein.

The technology of the present application is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein provide a more efficient user interface by providing suggestions that are tailored to a specific user's interests. The suggestions may be provided by a personal assistant or some other application running on a user's computing device. A goal of the technology described herein is to provide relevant suggestions when the user can and actually wants to use them. The suggestions are designed to provide information or services the user wants to use.

The suggestions may be provided when the user's context indicates a possible interest in the suggestion. The "possible interest" is derived from previous activity patterns and possibly activity patterns of other people. For example, a suggestion may be provided to activate or open a playlist of songs for the user. The context can be a time, place, and/or situation where the user has previously listened to the specific play set. For example, the user may listen to a particular play set when exercising at the gym. Upon determining that the present context of the user is at the gym, the suggestion to open the playlist may be surfaced to the user. Other types of suggestions can involve travel options, entertainment options, shopping options, and such depending on context. The suggestions may also be described as recommendations or scenarios herein.

The suggestions can be triggered based on an association rule. The association rule represents a user behavior pattern. Each user can have personalized association rules, even for the same suggestion. For example, a suggestion to listen to music can be triggered for a first user when the first user is at the gym and for a second user when the user gets home for work. The technology described herein analyzes user activity to determine when the user might be interested in a specific suggestion. The association rule associates a user context with a suggestion. The context can be multi-variable. For example, the context could be a location, time, and day. The suggestion can be a specific suggestion or a class of suggestion. The class of suggestion may take the form of a template to which data can be added to form a suggestion presented to the user. The suggestions can also be learned from analyzing user behavior patterns to generate personalized suggestions.

The association rule, in effect, assigns a probability that the user is interested in the suggestion given a specific context. Different users can have different probabilities associating the specific context and the suggestion. The probability in the association rule can be determined with a machine learning algorithm that analyzes the user's previous activities. The machine learning algorithm can also take into account the activities of a plurality of users to build association rules. In such a scenario, the user-specific data may be given more weight than the general data when calculating a probability for an association rule.

Aspects of the technology described herein collect user activity data that may be relevant to an association rule. The relevant information can be stored within data vectors that describe a specific activity or event engaged in by the user. For example, a music event that describes the user listening to music can include various vector components, such as the genre of music listened to, the time the music was listened to, the user's location when listening to the music, in addition to other information. Each part of the information may form a value for a component in the data vector. For example, a first component of the data vector may define a time for the event. The value associated with a first component can be extracted from the user activity information received from one or more user devices. Similarly, components of the data vector associated with a location, music genre, and such can be assigned values from the user activity data.

The data vectors are used as input to a machine learning method that generates the association rule. Different types of algorithms can be used to generate the association rule using the data vectors as input. Exemplary algorithms includes, but are not limited to: Multi-Relation Association Rules, Context Based Association Rules, weighted class learning, High-order pattern discovery, K-optimal pattern discovery, Approximate Frequent Itemset mining, Generalized Association Rules hierarchical taxonomy (concept hierarchy), Quantitative Association Rules, Interval Data Association Rules, Maximal Association Rules, Sequential pattern mining, and Sequential Rules.

The user activity data used to form the vectors may be described herein as signals or user signals. The signals can include state information received from or collected by a personal assistant running on one or more user devices. In addition to a personal assistant, the signal information can be provided by an email system, operating system, browser, or any other component a user's digital ecosystem. The signal data used to generate the association rules can be combined from multiple devices. The state information can describe a state of the computing device, such as time and location, as well as the state of individual applications such as a movie application, a music application, a dining or reservation application, a travel application, a shopping application, an email application, a calendar application, search data, web browsing, and such. In addition, credit card information, vendor information, or other account information can be received as a user signal to track user purchases. Aspects of the technology can provide the user an opportunity to opt in or out of the data sharing arrangements described herein.

Aspects of the technology described herein can perform signal enhancement. Some of the signals received from the personal assistant can be ambiguous or otherwise benefit from enhancement. For example, the signal data may include GPS information along with a timestamp and an indication that the user spent greater than a threshold period of time at the location. The signal can be enhanced by looking up an entity associated with the location, such as a restaurant or gym. Additional information can then be retrieved for the entity. For example, the restaurant could be determined to serve Korean food. Korean food could then be entered as a value in a data vector component describing the event.

Other types of signal enhancement can be personal to the user. For example, a calendar entry on the user's device may indicate "dinner with Mom." A knowledge base associated with the user could be analyzed to identify the user's mom and generate a companion entry in the restaurant event.

Having briefly described an overview of aspects of the technology described herein, an exemplary operating environment suitable for use in implementing the technology is described below.

Exemplary Operating Environment

Referring to the drawings in general, and initially to FIG. 1 in particular, an exemplary operating environment for implementing aspects of the technology described herein is shown and designated generally as computing device 100. Computing device 100 is but one example of a suitable computing environment and is not intended to suggest any limitation as to the scope of use of the technology described herein. Neither should the computing device 100 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or a combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 112 includes computer storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112, or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices, including I/O components 120, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 114 may be direct or via a coupling utilizing a serial port, parallel port, and/or other interface and/or system bus known in the art. Furthermore, the digitizer input component may be a component separate from an output component such as a display device, or in some embodiments, the usable input area of a digitizer may coexist with the display area of a display device, be integrated with the display device, or may exist as a separate device overlaying or otherwise appended to a display device. Any and all such variations, and any combination thereof, are contemplated to be within the scope of embodiments of the technology described herein.

An NUI processes air gestures, voice, or other physiological inputs generated by a user. Appropriate NUI inputs may be interpreted as ink strokes for presentation in association with the computing device 100. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

A computing device may include a radio. The radio transmits and receives radio communications. The computing device may be a wireless terminal adapted to receive communications and media over various wireless networks. Computing device 100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Figure 2:
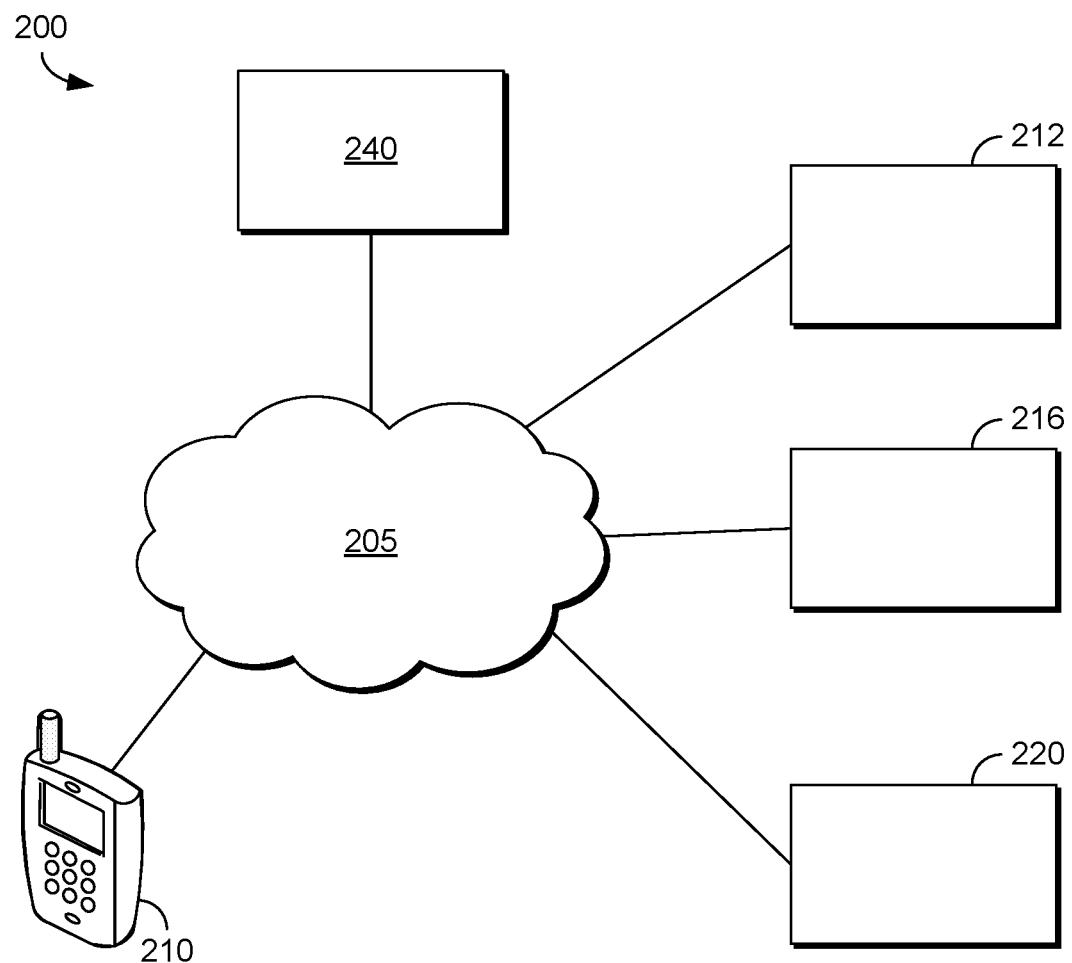
FIG. 2 is a diagram depicting an exemplary computing environment that can be used to generate a user-specific association rule, in accordance with an aspect of the technology described herein.

Turning now to FIG. 2, an exemplary wide area computing environment 200 is shown, in accordance with an aspect of the technology described herein. The computing environment 200 includes a mobile device 210 connected through wide area network 205 with personal assistant server 240 and a first service 212, a second service 216, and a third service 220 all associated with the user of the mobile device 210. In an aspect of the technology described herein, the mobile device 210 can communicate through network 205 with one of the personal assistant server 240 and other services. The mobile device 210 and the services can each provide signal data that is used to build data vectors describing an event. For example, the first service 212 could be an online music service, the second service 216 could be a reservation service, and the third service 220 could be a social network platform.

Figure 3:
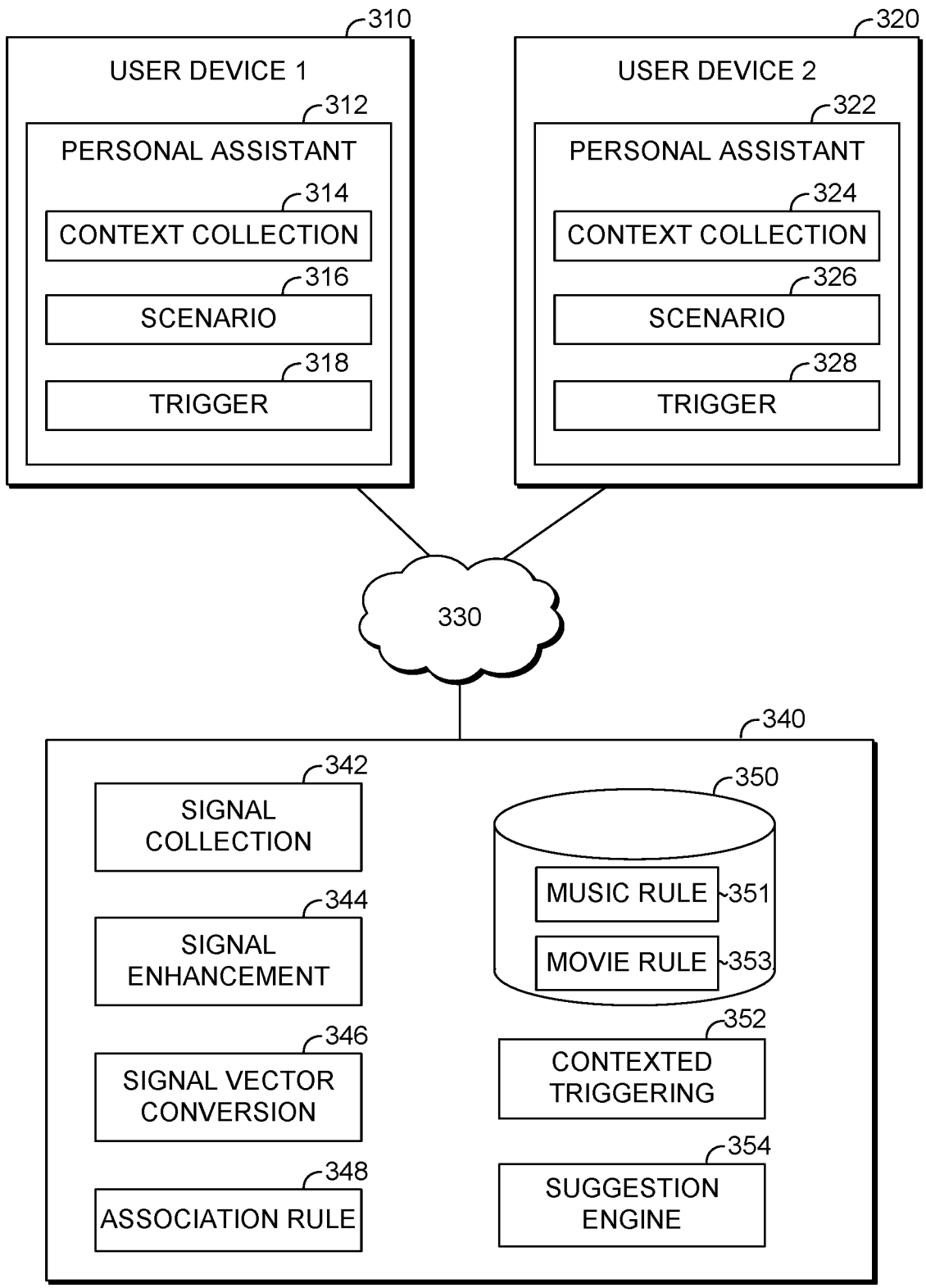
FIG. 3 is a diagram depicting an exemplary computing environment comprising multiple computing devices for generating a user-specific association rule, in accordance with an aspect of the technology described herein.

Turning now to FIG. 3, a computing environment 300 suitable for generating user-specific association rules is provided, in accordance with the technology described herein. The technology described herein is not limited to the components shown in FIG. 3. The components shown in FIG. 3 are merely exemplary. For example, the computing environment 300 includes two user devices associated with a user, but aspects of the technology described herein are not limited to use with two user devices. One user device may be sufficient, and users may have more than two user devices. In addition, in one aspect components located on the suggestion server 340 could be located on a user device, such as the first user device 310. For example, the signal enhancement and rule generation could occur on a client device instead of or in addition to a server.

The computing environment 300 includes a first user device 310, a second user device 320, network 330, and suggestion server 340. The first user device 310 and the second user device 320 are connected to the suggestion server 340 by network 330. Network 330 may be a wide area network, such as the Internet. The first user device 310 and the second user device 320 can be similar to computing device 100 described previously and can take the form of a smartphone, a tablet, an E-reader, smart glasses, a smart watch, a fitness tracker, an augmented reality headset, a laptop, a personal computer, or other computing device with Internet connectivity.

In an aspect of the technology described herein, the first user device 310 includes a personal assistant application 312. The personal assistant application 312 can provide suggestions to the user, such as those provided by a human personal assistant. A personal assistant 312 may be able to recognize the user's speech and provide audible or visible suggestions. In one aspect, the personal assistant 312 can interface with a user's calendar, email, task, web browsing, and other applications running on the first user device 310. The personal assistant 312 can also access state information or sensor information from the first user device 310. For example, the personal assistant 312 may be able to access GPS or other location information derived from Wi-Fi hotspots, cell towers, or other location methods.

In one aspect, the user explicitly provides permission for the personal assistant 312 to access this information and communicate the information to suggestion server 340. The user may be provided an opt-in or opt-out interface by the personal assistant 312 and otherwise notify the user about what information is being collected and transmitted to the suggestion server 340. The user may be allowed to specify what types of information may or may not be collected and transmitted.

The personal assistant application 312 includes three sub-components that can be used by aspects of the technology described herein. The three sub-components include a context collector 314, a scenario component 316, and a trigger component 318. It should be noted that the scenario and trigger components are optional in some aspects of the technology described herein. Instead of being located on the first user device 310, these components could be located where the functions of the component are performed remotely, such as with suggestion server 340. It should also be noted that the components could be standalone rather than integrated with the personal assistant application 312.

The personal assistant application 312 can help the user perform tasks through the one or more computing devices, such as the first user device 310 and the second user device 320, both associated with the user. A user is associated with the computing device when she uses the computing device or when the computing device knows and can collect context about the user. The user does not need to own the computing device; for example, a user's work computer could be owned by the employer but, nevertheless, be considered "associated with the user." Similarly, a user could share a family computer with multiple people, and the family computer can be considered "associated with the user." In fact, the family computer can be associated with multiple users. The context collection component on the family computer can understand which user is using the computer at a given time and associate context information with the appropriate user. In one aspect, a user is able to designate the devices that he or she is associated with. In one aspect, a user is associated with each device on which an instance of the personal assistant application 312 is installed and on which the user has registered his or her account information or user identification with the personal assistant application or the personal assistant is able to understand the user through other context (such as user's voice, face detection, etc.).

The personal assistant application 312 can help the user complete both computing tasks, such as sending an email or submitting a search query, and real world tasks, such as scheduling a pickup time for a user's dry cleaning on the way home from work. Suggestions can help the user complete either type of task by offering to open a relevant application or providing relevant information. Real world tasks, as used herein, occur, in part, outside of computers. For example, the exchange of physical good or services is an example of a real world task. Electronic tasks occur exclusively between computing devices and users of those computing devices. Displaying through a computer display or printing the result of a computerized communication have a real world element but are, nevertheless, considered electronic tasks for this application.

The personal assistant application 312 can monitor other applications and operating system functions. For example, the personal assistant application 312 may be able to monitor or have access to sensor data from one or more sensors on the first user device 310. For example, the personal assistant application 312 may have access to accelerometer data, gyro data, GPS location data, Wi-Fi location data, image data from a camera, sound data generated by a microphone, touch data from a touchscreen, and other information.

The personal assistant application 312 can monitor user activities within one or more other applications and store a record of this activity forming contextual information. The context collector 314 stores details of events performed through the smartphone or other devices running an instance of the personal assistant application. For example, the user could read an email on their first user device 310 causing a record of an "email read" event to be created. The "email read" record can describe a time and date when the email was read along with details describing the email, such as the recipients, subject line, description of attachments, etc. Similar information could be used to describe a text event. A call event could record the time and date of a call, call duration, and contact information (e.g., name, phone number) for the other person on the call. The contact information could be determined from caller ID information or taken from a local contact data store when the phone number matches an existing contact's phone number. All of this event data may be described as signal data.

In another example, the context collector 314 could generate a walking event. The absence of light from a camera could indicate that the phone is in the user's pocket and accelerometer data could indicate that the user is walking with the phone. The start time and stop time could be recorded to describe the walk event along with geographic location and/or route. The geographic information could be gathered from a GPS or other location technology within the smartphone. All of this information could be combined in a walking event data vector. Alternatively, if the user is listening to music during the walking event, the walking information could be included in a music data vector, as described separately.

A drive event could describe an instance of the user traveling in a car. As with the walking event, start and stop time of the drive event could be recorded along with geographic information such as a route. Additional information could include businesses visited before, after, or during the drive event. Geographic location information could be used to identify a business. Additionally, financial information could be gathered to confirm that a purchase was made during the drive event. A particular car may be identified by analyzing available Bluetooth connections, including when the smartphone connects to the car through a wireless or wired connection.

A specific type of drive event may include a public transportation event. The user's use of public transportation may be identifiable upon the user accessing a Wi-Fi connection provided by the transportation company. Further, route information could be analyzed to determine the user is on public transportation. For example, the route information including stops could be analyzed to determine that the route follows a bus route and the stops coincide with bus stops. Similarly, a route could be compared with a known train route to determine that public transportation is being used. Additionally, payment information may be analyzed to determine that public transportation is being used, as well as to gather additional details about the public transportation. In one instance, the payment information is provided through a near field communication system in the smartphone.

The context collector 314 may record an entertainment event. The location information for the smartphone may be compared with a database of known events. For example, the phone's location at a football stadium coinciding with a known ballgame event can cause an entertainment record to be created. As with other events, payment information, calendar information, email information, and other data may be combined to determine that an entertainment event record should be created and to provide details. The calendar information can include a calendar description of the event. The email information can include a discussion of the event with friends, a payment receipt, or other information related to the event. These are just a few of the types of events that could be collected.

The context collector 314 collects signal data from the first user device 310 and transmits the signal data over network 330 to the suggestion server 340. Specifically, the signal information may be received by the signal collection component 342. The context collector 314 can provide initial filtering of signal data to cause only the most relevant signal data or signal data meeting certain criteria to be sent to the signal collection component 342. In another aspect, the context collector 314 transmits all signal data without filtering. The context collector 314 may aggregate signal data for a period of time and then transmit it to the signal collection component 342. For example, the context collector 314 may only transmit signal data when connected to a Wi-Fi connection.

The scenario component 316 can store various scenarios or suggestions. The scenario can involve a suggestion for shopping, music, use of any functionality on the first user device 310, help suggestions, and such. The scenario component 316 may receive scenarios or suggestions from the suggestion engine 354. The scenarios or suggestions can be associated with an association rule. The association rule comprises a context criteria and a corresponding suggestion. The association rules may be grouped by type, and the suggestion actually provided may be generated in real time by the scenario component 316 by extracting information from the present context. For example, the association rule may indicate that the present context provides a high probability that the user is interested in seeing a movie in a movie theater. The type of suggestion may be to show movie times at a nearby theater. The scenario component 316 may identify one or more nearby theaters based on the present location of the user, which is part of the user's present context. The suggestion may be then generated using show times from the nearby theater, coupons or discounts for the nearby theater, and direction to the nearby theater. Other information could be included in this suggestion.

Other suggestions are fixed in advance and merely presented by the scenario component 316 when a present context of the user device matches a context associated with a scenario. For example, the suggestion can be to play a playlist when a context is satisfied. In this case, the playlist does not need to be generated in real time but can merely be activated or an offer to activate the playlist provided.

The trigger component 318 can be incorporated into the scenario component 316 or can be separate. The trigger component 318 monitors the present context of the first user device 310 to determine when the present context matches a context associated with an association rule and/or scenario. Upon determining that the present context matches the context associated with the scenario, the scenario component 316 can be notified. Additionally, the trigger component 318 may communicate with the suggestion server 340 to determine that the context and the suggestion server 340 could generate a scenario in real time and communicate it to the first user device 310. In this way, the trigger component 318 can work independently of a scenario component 316, which may not even be present on the first user device 310 in some implementations.

In another implementation, the trigger component 318 communicates present context information to the contextual triggering component 352 in real time. The contextual triggering component 352 then determines when the context of the first user device 310 matches a context associated with an association rule and/or scenarios. In this implementation, the context collector 314 communicates signal information for the purpose of generating user-specific association rules. The trigger component 318 communicates contextual information that can be used to trigger an association rule that has already been built previously.

The second user device 320 includes a personal assistant component 322, a context collector 324, a scenario component 326, and a trigger component 328. These components may work in a fashion similar to those described previously with reference to the first user device 310. The actual components may differ slightly based on characteristics of the two user devices. For example, the applications may have access to different signal data depending on the capabilities of the device. For example, the second user device 320 could be a laptop that does not include a GPS component; therefore, the context collector 324 would not be able to generate location information based on a GPS signal. The first and second user devices could also run on different operating systems requiring the various components to be programmed differently even though they perform a similar function.

The suggestion server 340 can operate in one or more data centers. The suggestion server 340 can be associated with a personal assistant server that aggregates information from multiple user devices associated with the user on which the personal assistant is operating. The suggestion server 340 includes a signal collection component 342, a signal enhancement component 344, a signal vector conversion component 346, an association rule component 348, an association rule data store 350, a contextual triggering component 352, and a suggestion engine 354.

The suggestion server 340 or associated personal assistant server can identify a user and a user's devices. The suggestion server 340 may provide a secure log-in for the user and allow the user to link multiple devices to the suggestion server 340.

The suggestion server 340 can manage security data, including authentication settings for a user across multiple devices. In one aspect, the suggestion server 340 stores password and user credential information for various online services and provides access to this information upon validating a user request received by a personal assistant application running on one of a user's devices.

The signal collection component 342 receives signals from one or more user devices describing user activities and context. The signal collection component 342 can also receive signals from web-based platforms such as online email and calendar applications associated with the user, online gaming platforms, online music platforms, online movie platforms, and other online services. The user may be provided an explicit opt-in or opt-out describing what information the user is willing to share with the signal collection component 342.

The signal enhancement component 344 can add to or clarify information within the signals. In one aspect, the signal enhancement component 344 can provide additional information about entities described in the signal data. In another aspect, the signal enhancement component 344 identifies entities associated with location data in the signal data. For example, the signal data could include information indicating that the user spent above a threshold amount of time at a particular location. An entity, such as a restaurant or other business associated with the location could be determined by the signal enhancement component 344. The signal enhancement component 344 can include an entity look-up table that associates various entities with locations. The signal enhancement component 344 can also identify or determine detailed information about different entities. For example, in addition to determining the name and location of a business, details about the services provided by the business can be determined. For example, the type of food served by a restaurant could be determined.

The signal enhancement component 344 can also include a knowledge base that includes personal information about the user. For example, the user's social contacts derived from an analysis of the user's social network, email, phone calls, and other information may be built. For example, signal enhancement component 344 may be able to determine which of several Mikes in the user's social network is associated with a current signal. For example, the signal enhancement component 344 may be able to determine that the user ate dinner with a first of three Mikes in the user's social network by determining that the first Mike was in a social post with the first user at the time the user was at the restaurant. The first Mike could then be included in a companion component of a data vector describing the dinning event.

The signal vector conversion component 346 receives signals and enriched signals as input and builds a data vector describing an event. Initially, the signal vector component 346 can use a classification process to identify signals that describe a specific event. Different types of data vectors may be built for different types of events. The data vectors for different types of events may have a different schema. The schema defines components of the data vector and the format that values associated with the components can take. For example, a music data vector may describe a music listening event. The music vector can include a date component, a time component, a duration component, a location component, a source component, a music genre component, a playlist component, and such. Each of the components can be associated with values taking a particular format. The source component can define a music source such as a music data store or online service. The genre can be determined through a signal enhancement component that retrieves a genre associated with one or more songs associated with the listening event. The listening event can be associated with a single song, a playlist, or a plurality of songs streamed from a music provider or music service. Though not shown, the suggestion server can include a genre classification component that classifies a song or a plurality of songs into a genre.

A movie vector could include a time component, a location component, a source component, a genre component, a companion component, and other components. The companion component can include identification information for one or more people that participated in the movie viewing experience with the user. The participants can be identified from social posts, emails, text messages, and location information collected from multiple users. In one aspect, location information from multiple users within a user's social network are mined to determine when the users are located at the same place at the same time. This information can be generated by the signal enhancement component 344 and added as a component of a vector.

A shopping data vector can include a time component, a location component, an entity component, a companion component, a brand component, a price component, and other components that describe a shopping event. The price component can include information received from a credit card or other financial institution detailing expenditures made during the shopping event. Various merchants or vendors may also provide detailed information about the shopping event that can be included within a shopping vector.

A restaurant vector can include a time component, a location component, a date component, a restaurant entity component, a restaurant food type component, a restaurant price component, a restaurant review component, a companion component, and others. The restaurant food type, price, and review components can be derived from a knowledge base. The review component describes a rating given to the restaurant.

In one aspect, the data vectors may include a component indicating whether the associated event was routine or non-routine. Events may be classified as routine or non-routine by a routine classifier that analyzes user events to determine whether a particular event is routine or non-routine. In one aspect, a user's location outside of a home geographic area can indicate that the event is non-routine. In one aspect, events that are dissimilar to other events in the user's history are initially classified as non-routine. As more data is gathered over time, the classification of an event can change from routine to non-routine. The routine classifier can classify various events as routine or non-routine. In addition, the routine classifier can determine whether the present context is a routine context or a non-routine context. When the present context is a non-routine context, non-routine association rules can be accessed to make suggestions. When the current context is routine, then routine association rules can be accessed to generate suggestions.

The association rule component 348 generates association rules using a machine learning algorithm using multi-dimensional data vectors as input. Each dimension can be a different contextual component, such as time, day, location, activity, etc. Different types of algorithms can be used to generate the association rule using the data vectors as input. Exemplary algorithms include, but are not limited to: Multi-Relation Association Rules, Context Based Association Rules, weighted class learning, High-order pattern discovery, K-optimal pattern discovery, Approximate Frequent Itemset mining, Generalized Association Rules hierarchical taxonomy (concept hierarchy), Quantitative Association Rules, Interval Data Association Rules, Maximal Association Rules, Sequential pattern mining, and Sequential Rules.

The association rule component 348 takes the data vectors generated by the signal vector conversion component 346 as input and generates an association rule as output. The association rules may be associated with a particular type of event. For example, a series of music association rules could be generated, a series of movie association rules could be generated, a series of shopping association rules could be generated, a series of travel association rules could be generated, and so forth. The various association rules can be stored in rule data store 350. A plurality of music rules 351 and movie rules 353 are shown. The user-specific association rules within the data store 350 can be supplemented with general association rules that are derived from data associated with multiple users, rather than data from the particular user.

The association rule component 348 may also take general data vectors from multiple users as input to build association rules. Each association rule includes a context and an associated suggestion. The association rule assigns a probability that the user will be interested in the suggestion given the context. In one aspect, only association rules with above a threshold probability are ultimately stored in the data store 350. A particular context may be associated with multiple suggestions in a plurality of association rules. In implementation, the various association rules may be ranked and the association rule with the highest probability used to generate a suggestion.

The association rule can be a multi-variable association rule where the context is defined with multiple parameters, such as time, location, day, companions, recent activities, etc. In this way, the association rule represents a user behavior pattern where past context and past behaviors are mapped to a current context and a suggestion related to the past behavior.

The contextual triggering component 352 can trigger the presentation of a suggestion when the corresponding context portion of an association rule is satisfied. The contextual triggering component 352 can receive real-time contextual or triggering information from a user device and determine when the present context of the user device matches the context in an association rule. The suggestion associated with that particular association rule can then be triggered. The context in the association rule can be multi-variable.

The suggestion engine 354 can generate suggestions in advance for subsequent triggering. The suggestion engine 354 can also generate suggestions in real time based on contextual data. Some suggestion types can include a template that can be completed by the insertion of contextual information. For example, the contextual information may indicate that based on the user's time and present companions that a restaurant suggestion is appropriate. However, the actual restaurant suggested can depend on the user's present location. Specifically, it may be desirable to present the user with a restaurant suggestion for a nearby restaurant. Accordingly, nearby restaurants of a type (e.g., Mexican food) associated with the suggestion may be retrieved and inserted into the suggestion that is ultimately presented to the user. Additional information, such as specials ongoing at the restaurant may also be retrieved in real time and added to the suggestion.

Figure 4:
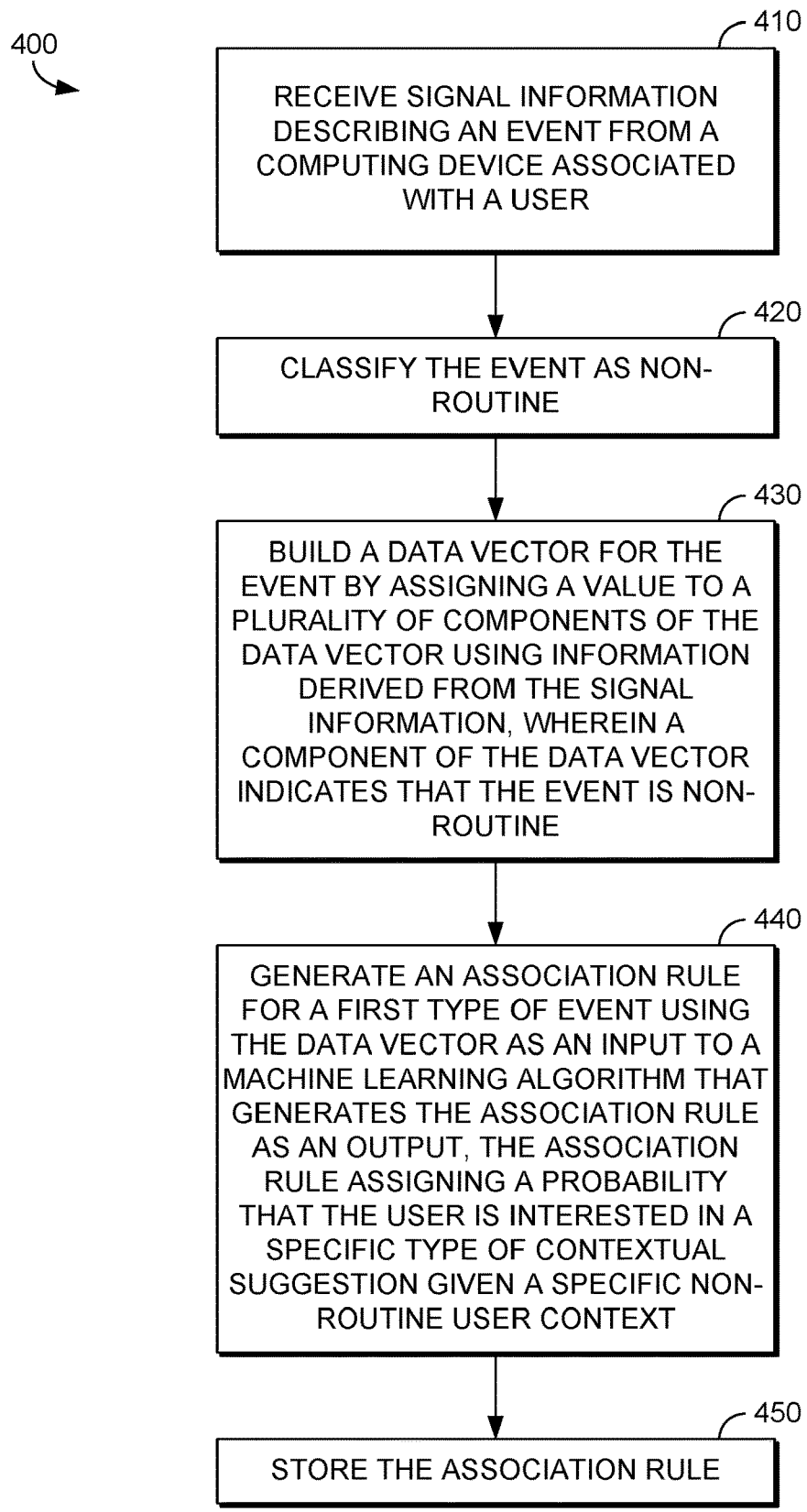
FIG. 4 is a diagram depicting a method of generating a user-specific association rule, in accordance with an aspect of the technology described herein.

Turning now to FIG. 4, a method 400 of generating user-specific contextual association rules is provided. Method 400 may be formed on a server located within a data center, for example, by suggestion server 340. At step 410, signal information describing an event is received from a computing device associated with a user. The signal information can include data describing the event as well as data describing other events or no events. Initially, data associated with a specific event can be identified using an event classification system.

Signal enhancement processes can be run on the signal information to disambiguate it or to provide supplemental information. In one aspect, an entity within the signal information is identified and supplemental information about the entity is retrieved from a knowledge base. The supplemental information can then be used along with information found directly in the signal information to generate a data vector for an event. In other words, the supplemental information can be a value associated with a component of the data vector.

The knowledge base can comprise information about the user. In one aspect, a user profile is populated with information gathered by a personal assistant and/or other components. The user profile can include information about where the user works, lives, and the people the user interacts with. This personal information can be used to disambiguate terms within the signal data.

At step 420, the event is classified as non-routine.

At step 430, a data vector for the event is built by assigning a value to a plurality of components of the data vector using information derived from the signal information. A component of the data vector indicates that the event is non-routine. As mentioned, a data vector comprises multiple components. Data vectors associated with different types of events can have different constituent components. In one aspect, each event identified within signal data can be represented by an individual data vector. Eventually, a plurality of data vectors describing different events can be generated.

At step 440, an association rule for a first type of event is generated using the data vector as an input to a machine learning algorithm that generates the association rule as an output. The data vector may be one of several data vectors used as an input to generate the association rule. In one aspect, data vectors associated with the same type of event are used to generate an association rule for the type of event. For example, a plurality of data vectors describing dining events can be used to generate a plurality of association rules for dining events. Different types of algorithms can be used to generate the association rule using the data vectors as input. Exemplary algorithms include, but are not limited to: Multi-Relation Association Rules, Context Based Association Rules, weighted class learning, High-order pattern discovery, K-optimal pattern discovery, Approximate Frequent Itemset mining, Generalized Association Rules hierarchical taxonomy (concept hierarchy), Quantitative Association Rules, Interval Data Association Rules, Maximal Association Rules, Sequential pattern mining, and Sequential Rules.

In one instance, only non-routine data vectors are used to generate an association rule classified as non-routine. Routine association rules can take routine data vectors as input. Additionally, multiple association rules may be generated simultaneously. The association rule assigns a probability that the user is interested in a contextual suggestion given a specific non-routine user context. The association rule may be classified as associated with a non-routine event.

The association rule can be a multi-variable association rule where the context is defined with multiple parameters, such as time, location, day, companions, recent activities, etc. In this way, the association rule represents a user behavior pattern where past context and past behaviors are mapped to a current context and a suggestion related to the past behavior.

At step 450, the association rule is stored. In one aspect, only association rules with above a threshold correlation between the context and the suggestion are stored.

Once an association rule is generated and stored, it can be used to present a suggestion to the user when a given context occurs. In one aspect, additional signal information is received from the user device associated with the user. As a single information is received, the context of the user may be determined. The context can be defined by the user's location, time of day, and what the user is doing, among other factors. The present context of the user can be determined to match the context in one or more association rules. When the context matches multiple association rules and the probabilities associated with the suggestion, the rules can be ranked, along with other factors to determine which suggestion is provided. When the context matches a single rule, then the suggestion may be presented to the user. As mentioned, the suggestion may be presented as a visual indication on a display associated with the computing device, audibly, or through some other method.

Figure 5:
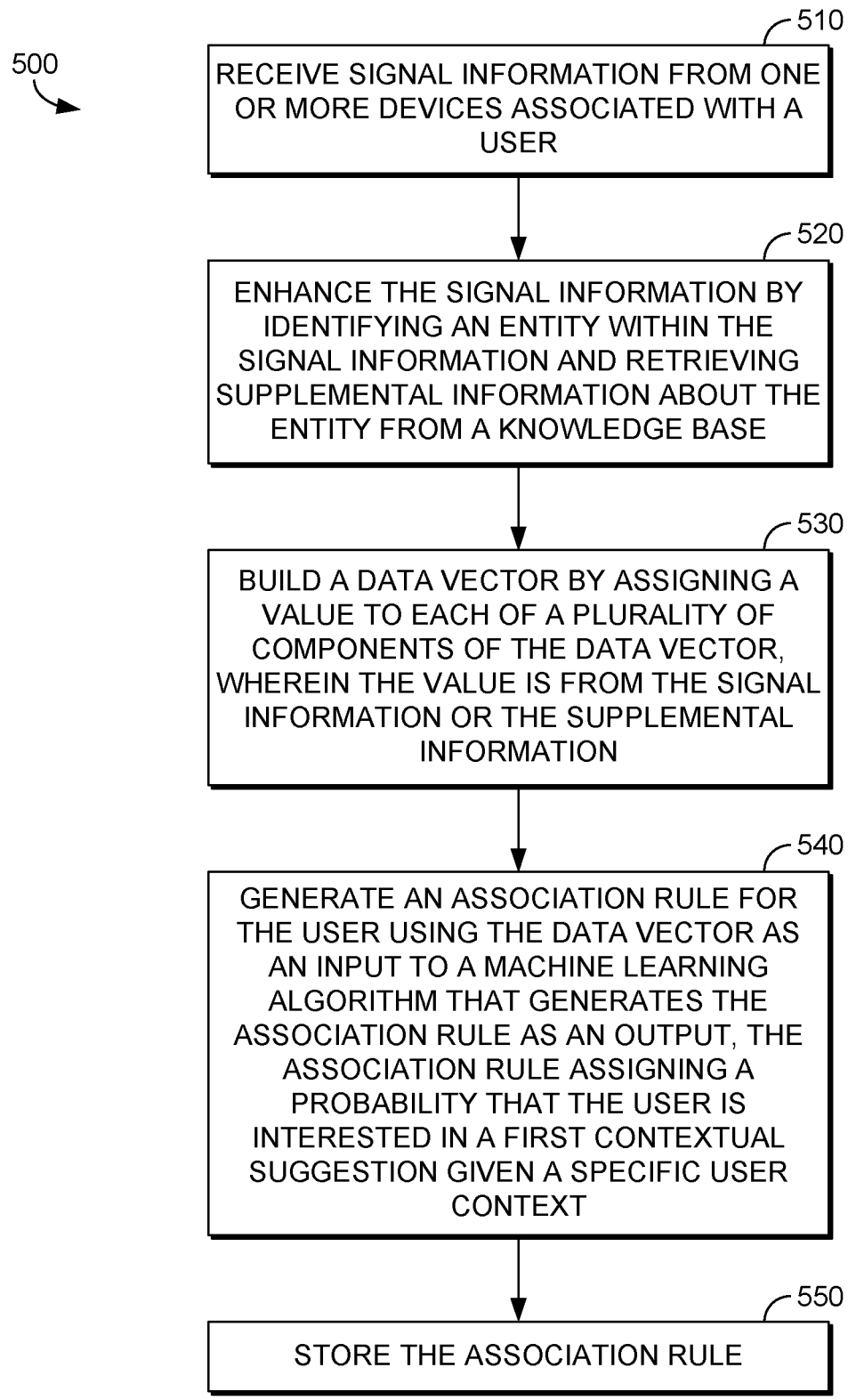
FIG. 5 is a diagram depicting a method of generating a user-specific association rule, in accordance with an aspect of the technology described herein.

Turning now to FIG. 5, a method 500 of generating user-specific contextual association rules is shown. Method 500 may be performed on a server located within a data center, for example, by suggestion server 340. At step 510, signal information from one or more devices associated with a user is received. The signal data may be received from multiple user devices including smartphones, smart watches, smart glasses, tablets, laptops, PCs, and other computing devices. In addition, signal data may be received from one or more online services such as video services, music services, shopping services, social networks, email services, and others. The signal information can include data describing the event as well as data describing other events or no events. Initially, data associated with a specific event can be identified using an event classification system.

At step 520, the signal information is enhanced by identifying an entity within the signal information and retrieving supplemental information about the entity from a knowledge base. For example, the entity could be a restaurant associated with a dining event, and the supplemental information could include food type, average price, average customer reviews, active specials during the dining event, and other information.

At step 530, a data vector is built by assigning a value to each of a plurality of components of the data vector. The value is from the signal information or the supplemental information. Different types of algorithms can be used to generate the association rule using the data vectors as input. Exemplary algorithms include, but are not limited to: Multi-Relation Association Rules, Context Based Association Rules, weighted class learning, High-order pattern discovery, K-optimal pattern discovery, Approximate Frequent Itemset mining, Generalized Association Rules hierarchical taxonomy (concept hierarchy), Quantitative Association Rules, Interval Data Association Rules, Maximal Association Rules, Sequential pattern mining, and Sequential Rules.

At step 540, an association rule for the user is generated using the data vector as an input to a machine learning algorithm that generates the association rule as an output. The association rule assigns a probability that the user is interested in a contextual suggestion given a specific user context.

The association rule can be a multi-variable association rule where the context is defined with multiple parameters, such as time, location, day, companions, recent activities, etc. In this way, the association rule represents a user behavior pattern where past context and past behaviors are mapped to a current context and a suggestion related to the past behavior.

At step 550, the association rule is stored. In one aspect, only association rules with above a threshold correlation between the context and the suggestion are stored.

Once an association rule is generated and stored, it can be used to present a suggestion to the user when a given context occurs. In one aspect, additional signal information is received from the user device associated with the user. As a single information is received, the context of the user may be determined. The context can be defined by the user's location, time of day, and what the user is doing, among other factors. The present context of the user can be determined to match the context in one or more association rules. When the context matches multiple association rules and the probabilities associated with the suggestion, the rules can be ranked, along with other factors to determine which suggestion is provided. When the context matches a single rule, then the suggestion may be presented to the user. As mentioned, the suggestion may be presented as a visual indication on a display associated with the computing device, audibly, or through some other method.

Aspects of the technology have been described to be illustrative rather than restrictive. It will be understood that certain features and subcombinations are of utility and may be employed without reference to other features and subcombinations. This is contemplated by and is within the scope of the claims.

The invention claimed is:

1. A method of generating user-specific contextual association rules, the method comprising:
   receiving signal information describing an event from a computing device associated with a user;
   classifying the event as non-routine;
   building a data vector for the event by assigning a value to a plurality of components of the data vector using information derived from the signal information, wherein a component of the data vector indicates that the event is non- routine;
   generating an association rule for a first type of event using the data vector as an input to a machine learning algorithm that generates the association rule as an output, the association rule assigning a probability that the user is interested in a contextual suggestion given a specific non-routine user context;
   storing the association rule;

receiving additional signal information from a device associated with the user;

determining a present context of the user from the additional signal information;

determining that the present context is the specific non-routine user context; and triggering the contextual suggestion.

2. The method of claim 1, wherein the method further comprises:

identifying an entity within the signal information; and retrieving supplemental information about the entity from a knowledge base, and wherein at least one of the plurality of components of the data vector is associated with a value derived from the supplemental information.

3. The method of claim 2, wherein the knowledge base comprises information about the user.

4. The method of claim 3, wherein at least a portion of the information is collected by a personal assistant running on the computing device.

5. The method of claim 1, wherein said classifying the event as non- routine is performed by an automated classifier.

6. The method of claim 1, wherein the data vector describes a dining event and includes a restaurant name component, a restaurant type component, and a time component.

7. The method of claim 1, wherein the method further comprises:

receiving additional signal information from a device associated with the user;

determining a present context of the user from the additional signal information;

determining that the present context is the specific non-routine user context; and triggering the contextual suggestion.

8. The method of claim 1, wherein the computing device is one of a smartphone or a personal computer.

9. One or more computer-readable storage media comprising instructions, which when executed by a computing device, cause the computing device to perform a method of generating user-specific contextual association rules, the method comprising:

receiving signal information describing an event from a computing device associated with a user;

classifying the event as non-routine;

building a data vector for the event by assigning a value to a plurality of components of the data vector using information derived from the signal information, wherein a component of the data vector indicates that the event is non- routine;

generating an association rule for a first type of event using the data vector as an input to a machine learning algorithm that generates the association rule as an output, the association rule assigning a probability that the user is interested in a contextual suggestion given a specific non-routine user context;

storing the association rule;

receiving additional signal information from a device associated with the user;

determining a present context of the user from the additional signal information;

determining that the present context is the specific non-routine user context; and triggering the contextual suggestion.

10. The media of claim 9, wherein the method further comprises:

identifying an entity within the signal information; and retrieving supplemental information about the entity from a knowledge base, and wherein at least one of the plurality of components of the data vector is associated with a value derived from the supplemental information.

11. The media of claim 10, wherein the knowledge base comprises information about the user.

12. The media of claim 11, wherein at least a portion of the information is collected by a personal assistant running on the computing device.

13. The media of claim 9, wherein said classifying the event as non- routine is performed by an automated classifier.

14. The media of claim 9, wherein the data vector describes a dining event and includes a restaurant name component, a restaurant type component, and a time component.

15. The media of claim 9, wherein the method further comprises:

receiving additional signal information from a device associated with the user;

determining a present context of the user from the additional signal information;

determining that the present context is the specific non-routine user context; and triggering the contextual suggestion.

16. The media of claim 9, wherein the computing device is one of a smartphone or a personal computer.

17. A method of generating user-specific contextual association rules, the method comprising:

receiving signal information describing an event from a computing device associated with a user;

classifying the event as non-routine;

building a data vector for the event by assigning a value to a plurality of components of the data vector using information derived from the signal information, wherein a component of the data vector indicates that the event is non- routine;

generating an association rule for a first type of event using the data vector as an input to a machine learning algorithm that generates the association rule as an output, the association rule assigning a probability that the user is interested in a contextual suggestion given a specific non-routine user context;

storing the association rule;

receiving additional signal information from a device associated with the user;

triggering the contextual suggestion in response to determining the additional signal information matches the specific non-routine user context.

18. The method of claim 17, wherein the method further comprises:

identifying an entity within the signal information; and retrieving supplemental information about the entity from a knowledge base, and wherein at least one of the plurality of components of the data vector is associated with a value derived from the supplemental information.

19. The method of claim 18, wherein the knowledge base comprises information about the user.

20. The method of claim 19, wherein at least a portion of the information is collected by a personal assistant running on the computing device.

21. The method of claim 17, wherein the data vector describes a dining event and includes a restaurant name component, a restaurant type component, and a time component.

* * * * *